(12) United States Patent
Prottengeier et al.

(10) Patent No.: US 6,485,049 B1
(45) Date of Patent: Nov. 26, 2002

(54) TRIM PANEL ASSEMBLY FOR A MOTOR VEHICLE

(75) Inventors: Gregg Prottengeier, Plymouth, MI (US); Tim Stillwell, Commerce Township, MI (US); Mark Bouvier Schatz, Lake Orion, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/747,187

(22) Filed: Dec. 21, 2000

(51) Int. Cl.[7] .............................................. B60R 21/22
(52) U.S. Cl. ..................... 280/730.2; 280/751; 296/39.1
(58) Field of Search ........................... 280/728.2, 730.1, 280/730.2, 751; 296/39.1; 24/296, 297; 52/715.5

(56) References Cited

U.S. PATENT DOCUMENTS

| | | | | |
|---|---|---|---|---|
| 5,111,619 A | * | 5/1992 | Billin et al. ................. 296/39.1 |
| 5,186,517 A | * | 2/1993 | Gilmore et al. ............. 296/39.1 |
| 5,639,140 A | * | 6/1997 | Labrash ....................... 296/39.1 |
| 5,927,790 A | * | 7/1999 | Futschik et al. ............. 296/39.1 |
| 5,951,094 A | * | 9/1999 | Konishi et al. .......... 280/751 X |
| 6,032,982 A | * | 3/2000 | Pakulsky et al. ........ 280/751 X |
| 6,129,410 A | * | 10/2000 | Kosaraju et al. ............ 296/39.1 |
| 6,145,908 A | * | 11/2000 | Deb et al. ................... 296/39.1 |
| 6,179,324 B1 | * | 1/2001 | White et al. ............. 280/730.2 |
| 6,189,961 B1 | * | 2/2001 | Poliskie .................. 296/39.1 X |
| 6,196,607 B1 | * | 3/2001 | Gulisano ..................... 296/39.1 |
| 6,199,907 B1 | * | 3/2001 | Mugford et al. ............. 280/751 |
| 6,254,123 B1 | * | 7/2001 | Urushi et al. ............. 280/730.2 |

FOREIGN PATENT DOCUMENTS

| DE | 4338249 | * | 5/1994 | ............. 280/751 X |
| EP | 0957010 | * | 5/1999 | .................. 280/751 |

* cited by examiner

Primary Examiner—Paul N. Dickson
Assistant Examiner—Toan To
(74) Attorney, Agent, or Firm—Mark P. Calcaterra

(57) ABSTRACT

A trim panel assembly for attachment to a body panel of a motor vehicle includes a main body portion and a mounting arrangement. The mounting arrangement includes a first mounting member. The first mounting member has a generally L-shaped configuration with a first leg and a second leg. The first leg extends generally perpendicular to the main body portion. The second leg extends generally parallel to the main body portion. Preferably, the mounting arrangement further includes a second mounting member for resiliently biasing the main body portion downward. In one particular application, the trim panel assembly is a B-pillar trim panel assembly. In this particular application, the first mounting member extends through an aperture in the B-pillar and the second mounting member resiliently engages a housing of an airbag assembly.

14 Claims, 4 Drawing Sheets

TRIM PANEL ASSEMBLY FOR A MOTOR VEHICLE

BACKGROUND OF THE INVENTION

1. Field of the Invention

This invention generally relates to motor vehicles. More specifically, this invention relates to a trim panel assembly which securely fastens to a motor vehicle body. In one exemplary application, this invention relates to a trim panel assembly for a motor vehicle during deployment of a B-pillar side airbag designed to resist forces generated which may otherwise separate the trim panel from the vehicle body.

2. Discussion of the Related Art

It is known in the pertinent art to provide a motor vehicle with various interior trim panels. The trim panels are secured to the motor vehicle body and provide the interior of the motor vehicle with an aesthetically pleasing appearance. It is desirable that the interior trim panels be quickly and easily attachable to the vehicle body. Additionally, it is desirable that the interior trim panels be securely attached and resist inadvertent separation with the motor vehicle body.

While known interior trim panels for motor vehicles have proven to be commercially acceptable for their intended purposes, continued advancement of the art is necessary. In this regard, Supplemental AirBag (SAB) or Supplemental Restraint Systems (SRS) are now in limited applications being disposed within motor vehicles in various positions. For example, it is known in the art to provide a supplemental airbag extending along the lateral sides of a headliner. Certain known trim panel assemblies may not be as suitable to withstand forces generated during deployment of such a supplemental airbag and may become inadvertently separated from the motor vehicle body.

It remains a need in the pertinent art to provide a trim panel assembly for a motor vehicle which is designed to resist forces generated during deployment of a supplemental airbag which may otherwise separate the trim panel assembly from the motor vehicle body.

SUMMARY OF THE INVENTION

It is a principal object of the present invention to provide a trim panel assembly with a mounting arrangement for more securely attaching the trim panel assembly to a motor vehicle frame.

It is a more particular object with the present invention to provide a trim panel assembly for a B-pillar of a motor vehicle having a mounting arrangement which opposes deployment forces from an adjacent airbag.

It is another object of the present invention to provide a trim panel assembly for a motor vehicle with a reduced number of parts.

The present invention provides a trim panel assembly for attachment to a body panel of a motor vehicle. The trim panel assembly includes a main body portion and mounting arrangement. The mounting arrangement includes a first mounting member having a generally L-shaped configuration with a first leg and a second leg. The first leg extends generally perpendicular to the main body portion while the second leg extends generally parallel to the main body portion.

The present invention provides a motor vehicle including a B-pillar and a trim panel assembly. The B-pillar includes an interior side defining an aperture. The trim panel assembly includes a mounting arrangement having a first mounting member with a generally L-shaped configuration. A first leg of the first mounting member extends generally perpendicular to the main body portion. A second leg of the mounting arrangement extends generally parallel to the main body portion. The first mounting member extends through the aperture of the B-pillar. The second mounting member preferably resiliently engages a housing of an airbag assembly and downwardly biases the main body portion.

BRIEF DESCRIPTION OF THE DRAWINGS

Still other advantages of the present invention will become apparent to those skilled in the art after reading the following specification and by references to the drawings in which.

DETAILED DESCRIPTION OF THE PREFERRED EMBODIMENT

Figure 1:
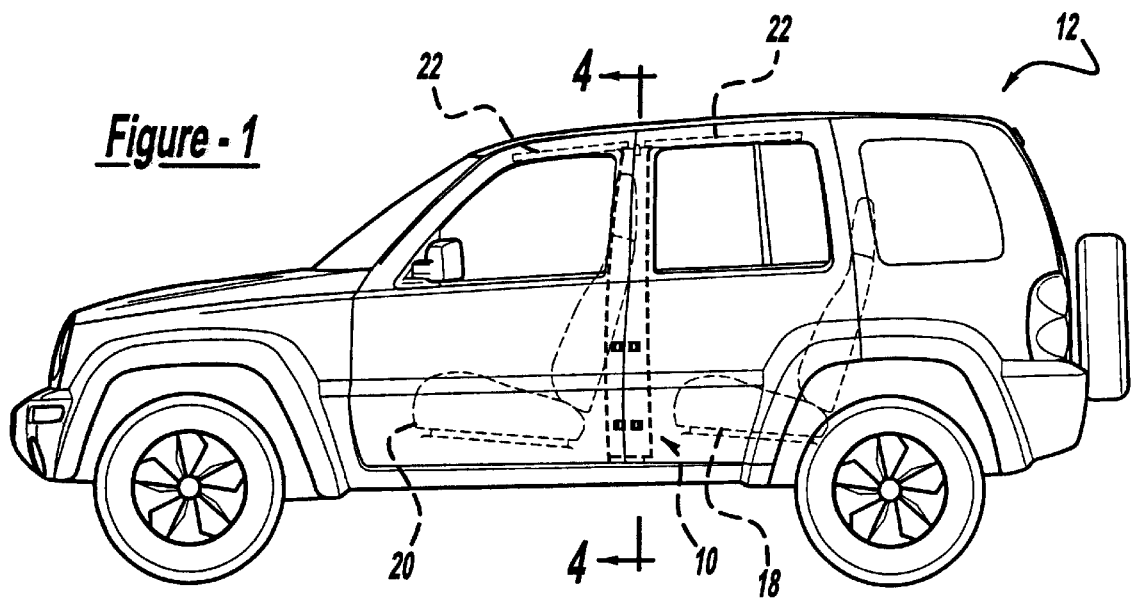
FIG. 1 is a perspective view of an automobile showing in phantom the location of a trim panel assembly constructed in accordance with the teachings of a preferred embodiment of the present invention.
Figure 2:
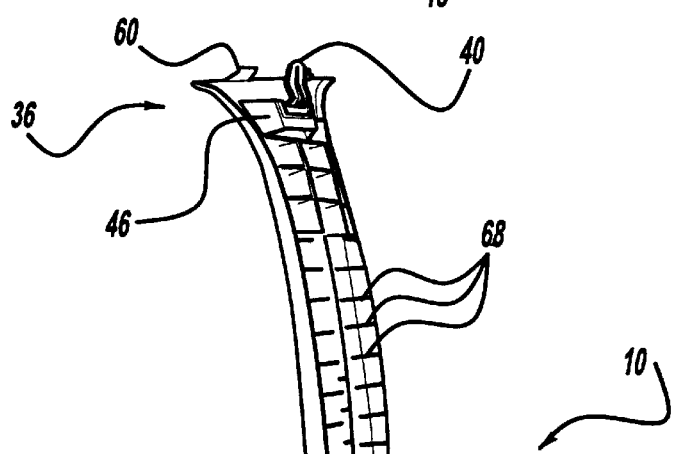
FIG. 2 is an enlarged rear and side perspective view of the trim panel assembly of the present invention shown removed from the motor vehicle for purposes of illustration.
Figure 3:
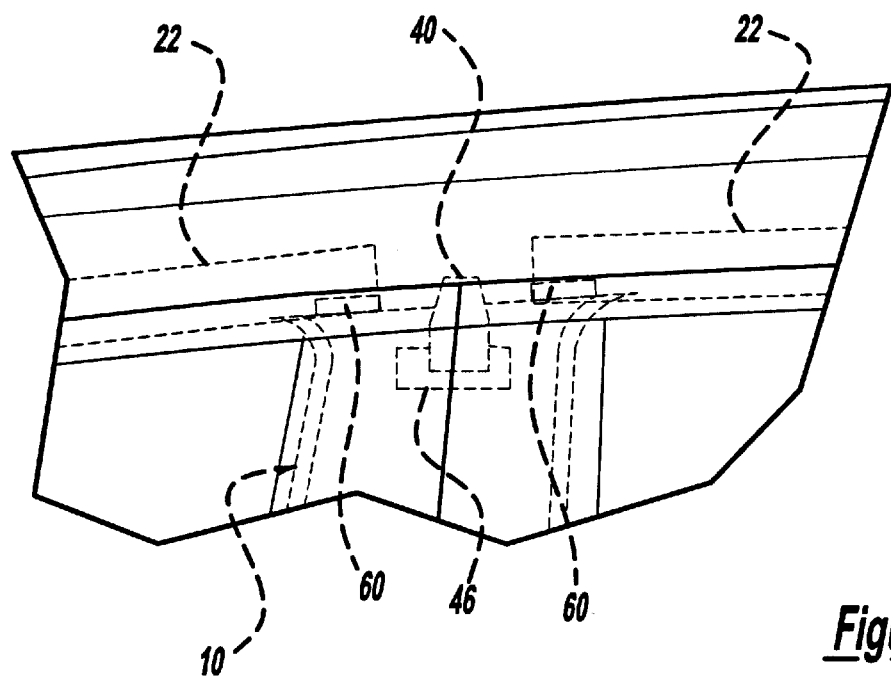
FIG. 3 is a detailed view showing the locations of the attachment members of the trim panel relative to the vehicle structure.
Figure 5:
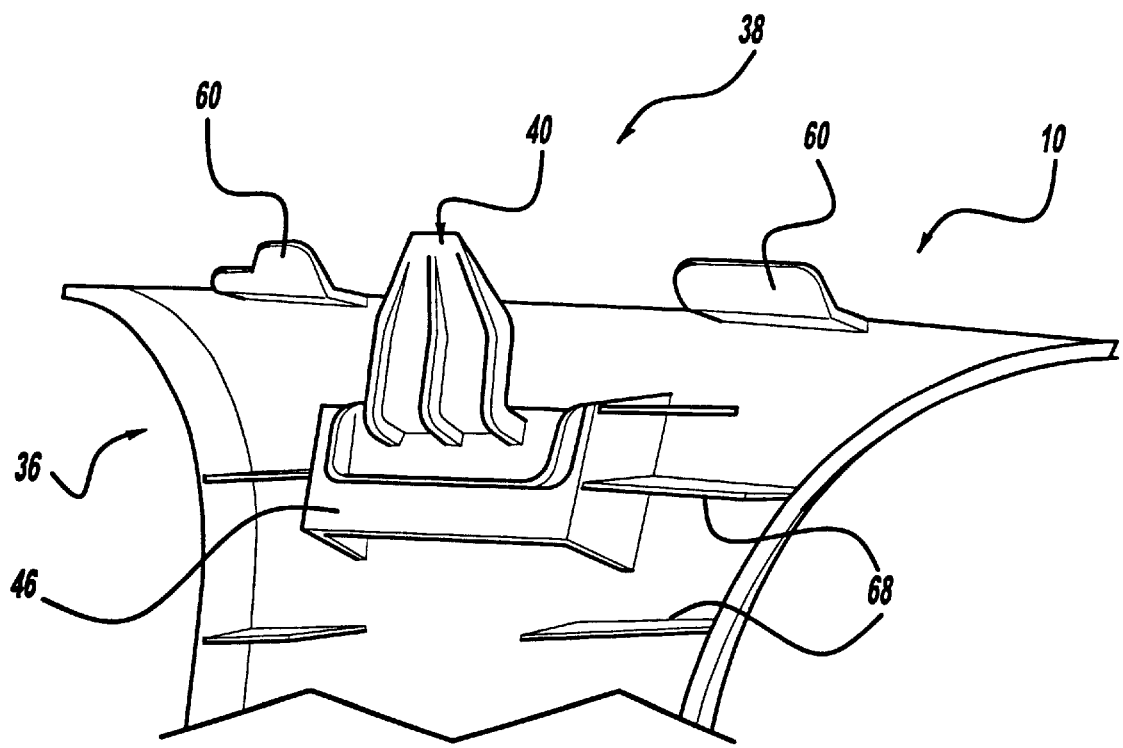
FIG. 5 is an enlarged perspective view of an upper end of the trim panel assembly of the present invention.

With reference initially to the environmental view of FIG. 1, a trim panel assembly constructed in accordance with the teachings of a preferred embodiment of the present invention is illustrated and generally identified by reference numeral 10. The trim panel assembly is shown operatively installed on a motor vehicle 12. It will be understood by those skilled in the art that the particular motor vehicle 12 illustrated in the drawings is merely exemplary. In this regard, the teachings of the present invention are applicable for various types of vehicles and are not limited to the application shown. Furthermore, it will be understood that while the trim panel assembly is preferably illustrated as a B-pillar trim panel assembly 10, the teachings of the present invention are likewise applicable to other trim panel assemblies.

Prior to addressing the construction and operation of the trim panel assembly 10 of the preferred embodiment of the present invention, an understanding of the exemplary use environment shown throughout the drawings is warranted. Insofar as the present invention is concerned, the remainder of the motor vehicle 12 will be understood to be conventional in nature. The motor vehicle 12 is illustrated to include a body 14 having a B-pillar 16 vertically disposed between a rear seat unit 18 and a front seat unit 20. An airbag assembly 22 is located adjacent to the lateral edge 24 of the vehicle headliner 26. A pair of airbag assemblies are located adjacent a lateral edge 24 of a vehicle headliner 26. Each of the airbag assemblies 22 includes a housing 28 interconnected to the body 14 of the motor vehicle 12 and an airbag 30 for deployment into an interior 32 of the motor vehicle 12. The airbag 30 is shown in FIG. 4 in a deployed state.

With continued reference to FIG. 1 and additional reference to FIGS. 2 through 6, the trim panel assembly 10 of the present invention will be further described. The trim panel assembly 10 is illustrated to generally include a main body portion 36 and a mounting arrangement 38 for securing a portion of the trim panel assembly 10 to the B-pillar 16. In the exemplary embodiment, the mounting arrangement 38 is integrally formed with the main body portion 36 of an injection molded plastic or other suitable material. While this arrangement is preferred, it will be understood that the portions of the mounting arrangement 38 may be independently formed and attached to the main body portion 36 with fasteners or the like. The modern arrangement 38 includes a first mounting member 40. As shown perhaps most particularly in the cross section of FIG. 4, the first mounting member 40 includes a first leg 42 and a second leg 44. The first leg 42 is shown to integrally extend from a raised mounting platform 46 and is oriented generally perpendicular to the main body portion 36. The second leg 44 is oriented generally perpendicular to the first leg 42 and thus generally parallel to the main body portion 36. The second leg 44 includes a distal segment with an angled face 50 to facilitate entry of the first mounting member 40 through an aperture 52 defined in an interior side of the B-pillar 16. In the preferred embodiment, the thickness of the first mounting member 44 renders the first mounting member 44 substantially rigid and substantially-non-resiliently interconnected to the main body portion 36 of the trim panel 10.

In the preferred embodiment, the trim panel assembly 10 of the present invention further includes at least one second mounting member 60. In the exemplary embodiment illustrated, the trim panel assembly 10 includes a pair of second mounting members or mounting clips 60. It will be understood by those skilled in the art that the trim panel 10 may alternatively include 0,1,3 or more substantially identical second mounting members 60.

Figure 4:
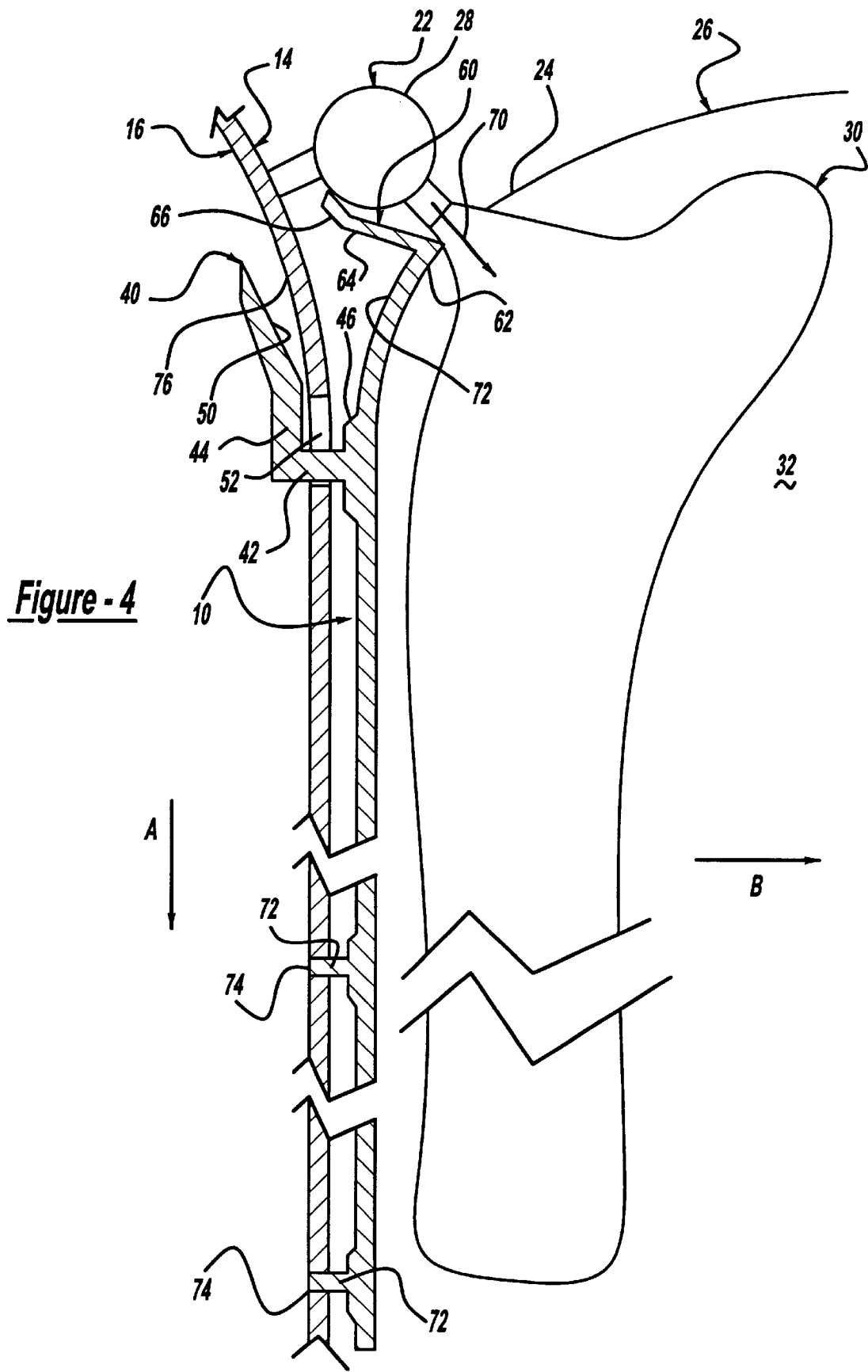
FIG. 4 is a cross-sectional view taken along the line 4—4 of FIG. 1 and the trim panel assembly of the present invention associated with a deployed automobile side airbag.
Figure 6:
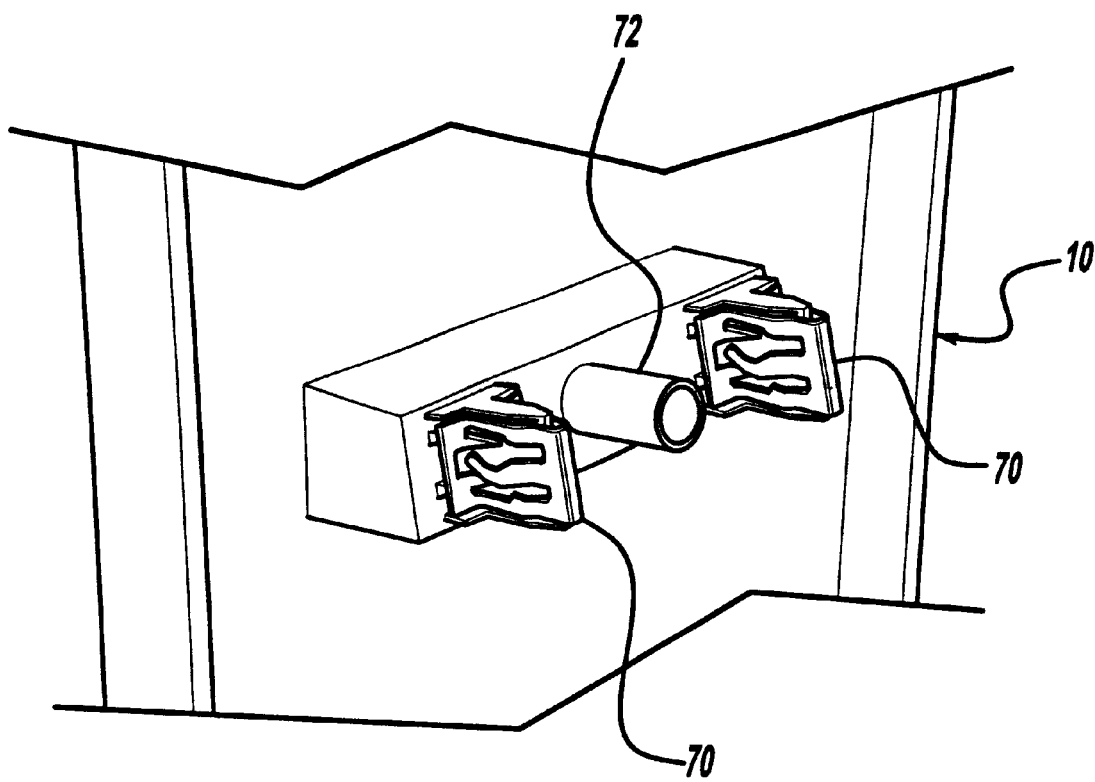
FIG. 6 is an enlarged perspective view of one of the pairs of attachment clips located on a rear side of the trim panel assembly of the present invention.

With particular reference to the cross sectional view of FIG. 4 which illustrates in detail one of the second mounting members 60, each second mounting member will be understood to extend from an upper end 62 of the main body portion 36. Each second mounting member 60 includes an arm 64 which is oriented generally perpendicular to the main body portion 36 and a distal segment 66 which depends from the arm 64 and is angled slightly with respect to the arm 64. In the preferred embodiment, the thickness of the second mounting members 60 is such that the second mounting members 60 are resilient relative to the main body portion 36. The end 66 of the second mounting members 60 resiliently engages the housing 28 of airbag assembly 22 and thereby biases the main body portion 36 downwardly in the direction of arrow A shown in FIG. 4.

The trim panel assembly of the present invention is illustrated to further include a plurality of structural ribs 68. The ribs laterally extend across the main body portion 36 and provide additional rigidity of the component.

The trim panel assembly 10 of the present invention further preferably includes two pairs of mounting clips 70. Each of the pairs of mounting clips 70 are associated with a mounting post 72 which engages an aperture 74 provided in the B-pillar 16. The mounting clips 70 engage a cooperating structure on the B-pillar 16 for securing a central and a lower portion of the trim panel assembly 10 to the B-pillar 16. It will be understood by those skilled in the art that the mounting clips 70 and the posts 72 as well as their engagement with B-pillar 16 are all conventional in nature and need not be described for the purposes of complete understanding of the present invention.

During vehicle assembly, the trim panel assembly 10 is rotated slightly counter-clockwise from the orientation shown in FIG. 4 and the second arm 44 is inserted into the aperture 52 of the B-pillar 16. At the same time, the resilient second mounting members 60 engage the housing 28 of the airbag assembly 22. The trim panel assembly 10 is then rotated in a clockwise direction while the operator provides an upwardly directed force against the bias provided by the second mounting member 60. When the trim panel assembly 10 reaches the orientation shown in FIG. 4, the second mounting member 60 functions to bias the main body portion 36 downwardly. In this position, the first leg 42 of the first mounting member 40 is substantially adjacent a lower end of the aperture 52 of the B-pillar 16. In the event of deployment of the airbag assembly 22, the second mounting member 60 ensures proper orientation of the trim panel assembly 10 relative to the airbag assembly 22 and further ensures that the airbag 30 and deployment gases are directed between the main body portion 36 and the headliner 26. In this regard, the airbag 30 and inflation gases 70 are not permitted to push against a rear side 72 of the main body portion 36.

Further in the event of airbag deployment, the first arm 42 of the first mounting member 40 abuts the opening for the aperture 52 and prevents further downward translation of the trim panel assembly 10. The second arm 44 of the first mounting member 40 substantially abuts a rear side 76 of the B-pillar and opposes any force that would inwardly direct the trim panel assembly 10 in a direction away from the B-pillar 16 as indicated by arrow B in FIG. 4.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A trim panel assembly for attachment to a body panel of a motor vehicle, the trim panel assembly comprising:

a main body portion; and a mounting arrangement including a first mounting member having a generally L-shaped configuration with a first leg and a second leg, the first leg extending generally perpendicular to the main body portion through an aperture in the body panel, the second leg extending generally parallel to the main body portion and adapted to be disposed on a side of the body panel opposite the main body portion, the mounting arrangement further including a second mounting member for resiliently biasing the main body portion downward.

2. The trim panel assembly of claim 1, wherein the first mounting member is integrally formed with the main body portion.

3. The trim panel assembly of claim 1, wherein the first mounting member is substantially rigid and non-resiliently connected to the main body portion.

4. The trim panel assembly of claim 1, wherein the second leg includes an angled segment to facilitate entry into the aperture of the body panel.

5. The trim panel assembly of claim 1, wherein the second mountng member is integrally formed with the main body portion.

6. A trim panel assembly in combination with a B-pillar of a motor vehicle, the B-pillar including an interior side having an aperture, the trim panel assembly comprising:

a main body portion; and a mounting arrangement including a first mounting member having a generally L-shaped configuration with a first leg and a second leg, the first leg extending generally perpendicular to the main body portion through the aperture in the interior side of the B-panel, the second leg extending generally parallel to the main body portion and disposed on a side of the interior side opposite the main body portion, the mounting arrangement further including a second mounting member for resiliently biasing the main body portion downward.

7. The trim panel assembly of claim 6, wherein the first mounting member is integrally formed with the main body portion.

8. The trim panel assembly of claim 6, wherein the first mounting member is substantially rigid and non-resiliently connected to the main body portion.

9. The trim panel assembly of claim 6, wherein the second leg includes an angle segment to facilitate entry into the aperture of the interior side of the B-pillar.

10. The trim panel assembly of claim 6, wherein the second mounting member is integrally formed with the main body portion.

11. A motor vehicle comprising:

a body including a B-pillar having an interior side defining an aperture;

an airbag assembly having a housing interconnected to the body of the motor vehicle; and a trim panel assembly attached to the interior side of the B-pillar, the trim panel assembly including a main body portion and a mounting arrangement, the mounting arrangement including a first mounting member having a generally L-shaped configuration with a first leg and a second leg, the first leg extending generally perpendicular to the main body portion through the aperture in the interior side of the B-pillar, the second leg extending generally parallel to the main body portion and disposed adjacent a side of the B-pillar opposite the main body portion, the mounting arrangement further having a second mounting member resiliently engaging the housing and biasing the main body portion downward.

12. The motor vehicle of claim 11, wherein the mounting member of the trim panel assembly is integrally formed with the main body portion.

13. The motor vehicle of claim 11 wherein the second leg includes an angled segment to facillitate entry into the aperture of the interior side of the B-pillar.

14. The motor vehicle of claim 11, wherein the second mounting member is integrally formed with the main body portion at an upper end of the main body portion.

* * * * *